(12) United States Patent
Grace et al.

(10) Patent No.: US 11,027,624 B2
(45) Date of Patent: Jun. 8, 2021

(54) ELECTRIC VEHICLE CHARGING BY ADJUSTING CHARGER CURRENT BASED ON BATTERY CHEMISTRY

(71) Applicant: Proterra Inc., Greenville, SC (US)

(72) Inventors: Dustin Grace, San Carlos, CA (US); Seamus T. McGrath, Simpsonville, SC (US)

(73) Assignee: Proterra Inc., Burlingame, CA (US)

( * ) Notice: Subject to any disclaimer, the term of this patent is extended or adjusted under 35 U.S.C. 154(b) by 63 days.

(21) Appl. No.: 15/705,920

(22) Filed: Sep. 15, 2017

(65) Prior Publication Data
US 2019/0084435 A1 Mar. 21, 2019

(51) Int. Cl.
| | |
|---|---|
| *B60L 53/62* | (2019.01) |
| *H02J 7/00* | (2006.01) |
| *B60L 53/66* | (2019.01) |
| *B60L 11/18* | (2006.01) |
| *B60L 53/14* | (2019.01) |
| *B60L 53/30* | (2019.01) |
| *H01M 10/44* | (2006.01) |
| *H02J 7/04* | (2006.01) |
| *H01M 10/42* | (2006.01) |

(52) U.S. Cl.
CPC ............ *B60L 53/62* (2019.02); *B60L 11/1848* (2013.01); *B60L 53/14* (2019.02); *B60L 53/32* (2019.02); *B60L 53/66* (2019.02); *H01M 10/443* (2013.01); *H02J 7/00036* (2020.01); *H02J 7/00712* (2020.01); *H02J 7/007188* (2020.01); *H02J 7/007192* (2020.01); *H02J 7/045* (2013.01); *B60L 2200/18* (2013.01); *B60L 2240/545* (2013.01); *H01M 2010/4271* (2013.01); *H01M 2220/20* (2013.01); *H02J 7/0027* (2013.01); *Y02T 90/12* (2013.01); *Y02T 90/14* (2013.01)

(58) Field of Classification Search
CPC .............. B60L 11/1848; B60L 11/1861; B60L 11/1816; B60L 58/12; B60L 53/665; B60L 53/14; B60L 2240/545; B60L 2200/18; B60L 53/62; B60L 53/66; B60L 53/32; H02J 7/0027; H02J 7/007188; H02J 7/00712; H02J 7/00036; H02J 7/007192; H02J 7/045; Y02T 90/14; Y02T 90/128; Y02T 90/121; Y02T 90/12; H01M 10/443; H01M 2010/4271; H01M 2220/20
USPC ........................................................ 320/109
See application file for complete search history.

(56) References Cited

U.S. PATENT DOCUMENTS

| | | | |
|---|---|---|---|
| 8,453,773 B2 | 6/2013 | Hill et al. | |
| 9,260,025 B1 | 2/2016 | McGrath et al. | |
| 9,321,366 B1 | 4/2016 | Simonini et al. | |
| 9,352,658 B2 | 5/2016 | Morris et al. | |
| 9,365,128 B2 | 6/2016 | Sarkar et al. | |
| 9,423,465 B1 | 8/2016 | Watts | |
| 9,669,719 B1 | 6/2017 | Gerber et al. | |
| 10,737,585 B2 * | 8/2020 | Chaudhary | ........... B60L 53/665 |

(Continued)

*Primary Examiner* — Richard Isla
*Assistant Examiner* — Manuel Hernandez
(74) *Attorney, Agent, or Firm* — Bookoff McAndrews, PLLC

(57) ABSTRACT

A method for charging an electric vehicle using charge current from a charging source. The charge current is determined based at least on the state of charge of the electric vehicle and a chemistry or type of the battery system.

9 Claims, 6 Drawing Sheets

(56) References Cited

U.S. PATENT DOCUMENTS

| | | | |
|---|---|---|---|
| 2008/0039980 A1* | 2/2008 | Pollack | H02J 13/00002 700/295 |
| 2011/0227534 A1* | 9/2011 | Mitsutani | B60K 6/445 320/109 |
| 2013/0103378 A1* | 4/2013 | Tinnakornsrisuphap | B60L 15/2045 703/18 |
| 2013/0193918 A1 | 8/2013 | Sarkar et al. | |
| 2014/0070767 A1* | 3/2014 | Morris | B60L 5/42 320/109 |
| 2014/0217976 A1* | 8/2014 | McGrath | B60L 53/54 320/109 |
| 2015/0217651 A1* | 8/2015 | Dougan | H02J 7/00 320/109 |
| 2016/0137076 A1* | 5/2016 | King | B60L 53/00 320/108 |
| 2016/0144737 A1* | 5/2016 | Liu | H02J 7/0071 320/149 |
| 2016/0167645 A1* | 6/2016 | Park | B60W 10/08 701/22 |
| 2017/0136908 A1* | 5/2017 | Ricci | B60L 11/1831 |
| 2017/0190256 A1 | 7/2017 | McGrath et al. | |
| 2017/0366039 A1* | 12/2017 | Qin | H02J 7/0027 |

* cited by examiner

ELECTRIC VEHICLE CHARGING BY ADJUSTING CHARGER CURRENT BASED ON BATTERY CHEMISTRY

TECHNICAL FIELD

The current disclosure relates to systems and methods for charging an electric vehicle.

BACKGROUND

An electric vehicle (EV), also referred to as an electric drive vehicle, uses an electric motor for propulsion. Electric vehicles may include all-electric vehicles where the electric motor is the sole source of power, and hybrid electric vehicles that include an auxiliary power source in addition to the electric motor. In an electric vehicle, energy may be stored in one or more batteries (located in the electric vehicle) to power the electric motor. When the stored energy decreases, the batteries may be charged (or recharged) by connecting the vehicle to an external or auxiliary power supply. The flow of current into the battery during charging often increases the temperature of the battery. Increased charge current speeds up the battery charging process. However, increasing the charge current typically increases battery temperature which decreases battery life and vehicle performance as a result of the increased temperature. Embodiments of the current disclosure provide systems and methods to reduce the impact of charging on battery life and performance. The scope of the current disclosure, however, is defined by the attached claims, and not by the ability to solve any specific problem.

SUMMARY

Embodiments of the present disclosure relate to, among other things, systems and methods for controlling the charging of electric vehicles. Each of the embodiments disclosed herein may include one or more of the features described in connection with any of the other disclosed embodiments.

In one embodiment, a method for charging a battery system of an electric vehicle is disclosed. The method includes electrically connecting the electric vehicle to a charging source, determining a state of charge of the battery system, and determining a charge current based at least on the determined state of charge and a chemistry of the battery system. The method further includes charging the battery system using the charging source based on the determined charge current.

In another embodiment, a method for charging an electric vehicle having one or more batteries is disclosed. The method comprises electrically connecting the electric vehicle to a utility grid, determining a state of charge of the one or more batteries, and determining a charge current based at least on the determined state of charge and a temperature of the one or more batteries. The method also includes directing a magnitude of current substantially equal to the determined charge current from the utility grid to the one or more batteries for charging.

In yet another embodiment, a method for charging an electric vehicle battery system is disclosed. The method includes electrically connecting the electric vehicle to a charging source, and determining a state of charge of the battery system. The method also includes determining a charge current based on at least the determined battery state of charge and a chemistry of the battery system, and charging the electric vehicle by directing a value of current based on the determined charge current from the charging source to the battery system. The method further includes determining an updated state of charge of the battery system after initiation of charging, determining a revised charge current based at least on the determined updated state of charge, and adjusting the value of current directed to the vehicle based on the revised charge current.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes methods of charging of an electric bus to increase vehicle efficiency and battery life without sacrificing operational efficiency. While principles of the current disclosure are described with reference to an electric bus, it should be understood that the disclosure is not limited thereto. Rather, the systems and methods of the present disclosure may be used to control the charging of any vehicle (cars, trucks, etc.) that uses one or more electric motors for propulsion.

Figure 1:
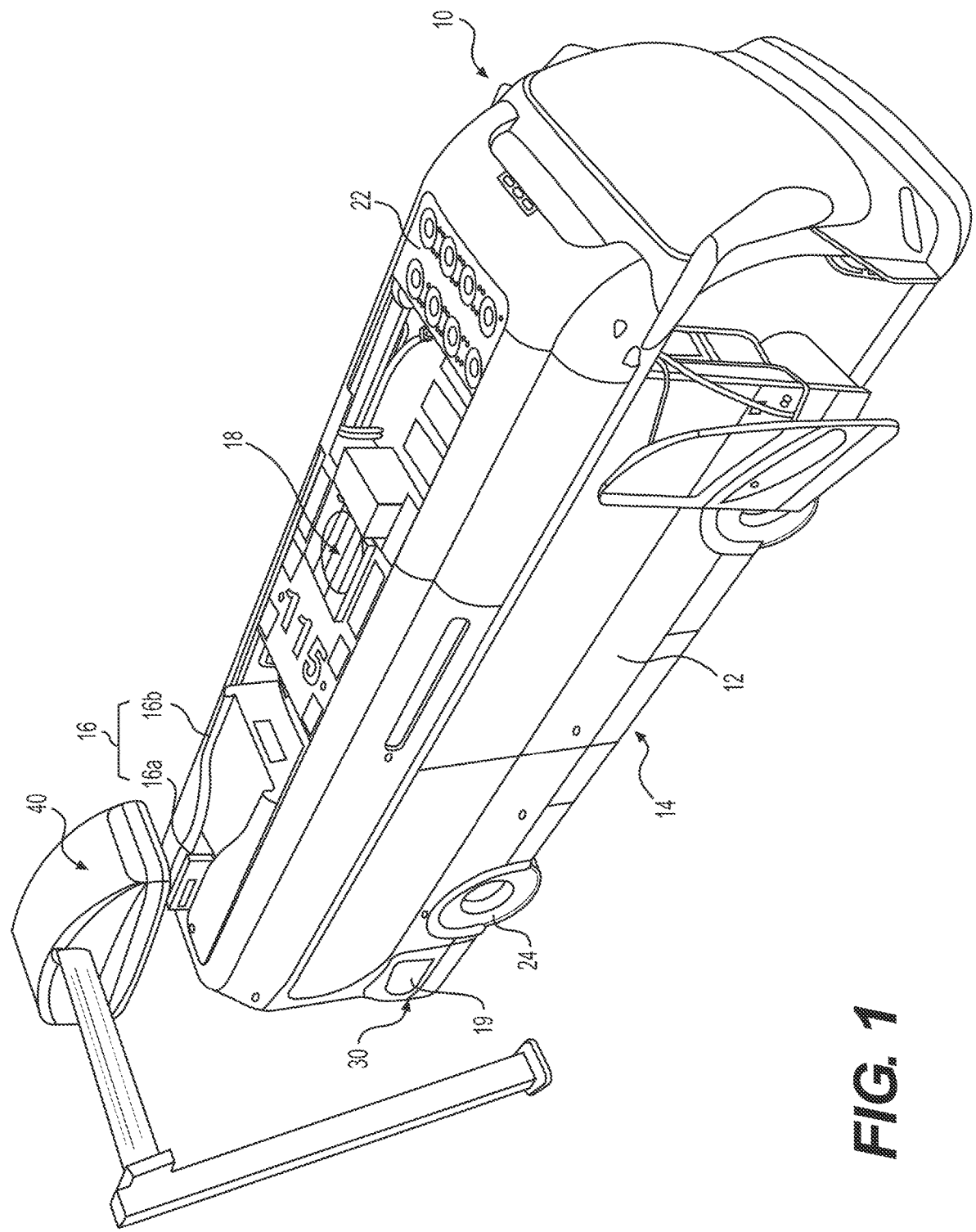
FIG. 1 is an illustration of an exemplary electric bus.

FIG. 1 illustrates an electric vehicle in the form of an electric transit bus 10. Electric bus 10 may include a body 12 enclosing a space for passengers. In some embodiments, some (or all) parts of body 12 may be fabricated using one or more composite materials to reduce the weight of bus 10. Without limitation, body 12 of bus 10 may have any size, shape, and configuration. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches from the road surface. In this disclosure, the term "about" is used to indicate a possible variation of ±10% in a stated numeric value.

Bus 10 may include a powertrain 30 that propels bus 10 along a road surface. Powertrain 30 may include a single electric motor (not shown) that generates power, and a transmission that transmits the power to drive wheels 24 of bus 10. Alternatively, bus 10 could include multiple electric motors, for example, an electric motor associated with some or all of the wheels of bus 10. Batteries 14 may store electrical energy to power the electric motor. In some embodiments, these batteries 14 may be positioned under the floor of bus 10, and may be configured as a plurality of battery packs. These battery packs may be positioned in cavities (not shown) located under the floor of bus 10, and may be accessible from below bus 10.

In some embodiments, the layout and design of batteries 14 may enable fast charging of batteries 14. By fast charging, batteries 14 may be recharged (to any final state of charge or SOC) in less than or equal to, for example, about 5 minutes, 10 minutes, 15 minutes, etc. In some embodiments, the batteries 14 may be recharged at a slower rate (e.g., overnight, etc.). As would be recognized by a person skilled in the art, state of charge (or SOC) is the ratio of the energy stored in a battery (battery cell, battery module, battery pack, etc. of batteries 14) at any time over the total energy capacity of the battery, typically expressed as a percentage (i.e., SOC=energy stored in the battery/total energy capacity of the battery*100). The SOC may be based on the total energy capacity of the batteries 14 or an operational energy capacity (a subset of the total energy capacity) of the batteries 14. For example, if an exemplary battery system of a bus has a total energy capacity of 500 kilo Watt hours (kWh), an energy range of 0-500 kWh corresponds to an SOC range of 0-100% in terms of total energy capacity. However, in some embodiments, the bus may restricted to operate in a smaller range (e.g., 200-300 kWh) within the total energy range (considering factor of safety, safety margin, etc.). That is, the operational energy capacity range in the example above is 200-300 kWh. In this case, 200-300 kWh corresponds to an SOC range of 0-100% in terms of operational energy capacity. The current disclosure is applicable irrespective of the type of SOC (total or operational) being considered. Therefore, in the discussion below, the phrase SOC applies to both operational and total SOC.

Batteries 14 of bus 10 may have any chemistry and construction. In some embodiments, batteries 14 may be lithium titanate batteries, lithium nickel manganese cobalt oxide batteries, lithium nickel cobalt aluminum oxide batteries, lithium cobalt oxide batteries, lithium manganese oxide batteries, lithium nickel manganese cobalt oxide batteries, or lithium iron phosphate batteries. It is also contemplated that, in some embodiments, batteries 14 may include multiple different chemistries. For example, some of batteries 14 may be lithium titanate batteries, while others may have another chemistry (for example, lead-acid, nickel cadmium, nickel metal hydride, lithium ion, zinc air, etc.). Some possible battery chemistries and arrangements in bus 10 are described in commonly assigned U.S. Pat. No. 8,453,773 which is incorporated herein by reference in its entirety. Although batteries 14 are described as being positioned under the floor of bus 10, this is only exemplary. In some embodiments, some or all of batteries 14 may be positioned elsewhere on bus 10. For example, some or all of batteries 14 may be positioned on the roof of bus 10.

As known to people skilled in the art, bus 10 may be charged and recharged by several methods. In some embodiments, a charging interface 16 (located, for example, on the roof of bus 10) may be used to charge bus 10 when bus 10 is travelling on a route (referred to herein as on-route charging). The charging interface 16 may include components that interface with an external charging station 40 to charge batteries 14. The charging interface may have any structure. In some embodiments, the charging interface 16 may include a charging blade 16a and an alignment scoop 16b. Alignment scoop 16b may align and direct a charge head (illustrated in FIG. 3) of charging station 40 towards charging blade 16a to electrically connect them and charge batteries 14. U.S. Pat. Nos. 9,352,658 and 9,365,128, incorporated by reference in their entirety herein, describe an exemplary type of charging blade. For example, see FIGS. 10-11 of the 658 patent and FIGS. 8B, 9, and 11 of the '128 patent. In some embodiments, the charging interface may have a different structure. For example, a plurality of charge-receiving electrodes (e.g., elongate plates or bars) positioned on an external surface (e.g., on the roof, side, etc.) of the bus may engage with charging electrodes of the charging station (e.g., elongate pantograph type charging electrodes) to charge the bus. U.S. Pat. No. 8,324,858, incorporated by reference in its entirety herein, describes an exemplary type of such a charging interface. For example, see FIGS. 1-3 of the '858 patent. In some embodiments, while travelling on a route, the charging interface of the bus may engage with the charge head (or charging electrodes) of a road-side charging station 40 to charge batteries 14. Exemplary methods of on-route charging are described in commonly assigned U.S. Patent Application Publication Nos. US 2013/0193918 A1 and US 2014/0070767 A1, which are incorporated by reference in their entirety herein.

The above described charging methods are only exemplary. In some embodiments, batteries 14 may be charged by connecting a cable carrying utility grid power to a charge port 19 of bus 10 when the bus is parked, for example, at a bus depot, garage, etc. (referred to herein as shop-charging or depot-charging). An exemplary method of depot-charging bus 10 is described in commonly assigned U.S. patent application Ser. No. 15/227,163, filed Aug. 3, 2016, which is incorporated by reference in its entirety herein. It is also contemplated, that in some embodiments, batteries 14 may be charged using wireless technology (such as, e.g., inductive charging). Alternatively or additionally, bus 10 may also include an on-board charging device to charge batteries 14. The on-board charging device may include an auxiliary power generation device (such as, an internal combustion engine or a fuel cell positioned, for example, on the roof) that generates power to charge batteries 14. In some embodiments, bus 10 may be a pure electric vehicle and thus does not include an internal combustion engine.

Bus 10 may also include components such as an HVAC system 18 to cool the passenger compartment, and a radiator 22 to cool the heat producing components of bus 10. A coolant may circulate between the radiator 22 and the heat producing components (such as, for example, motor, batteries, etc.) to dissipate heat produced by these components. Although HVAC system 18, radiator 22, and charging interface 16 are illustrated as being positioned on the roof of bus 10, in general, these components may be positioned anywhere on bus 10.

Figure 2:
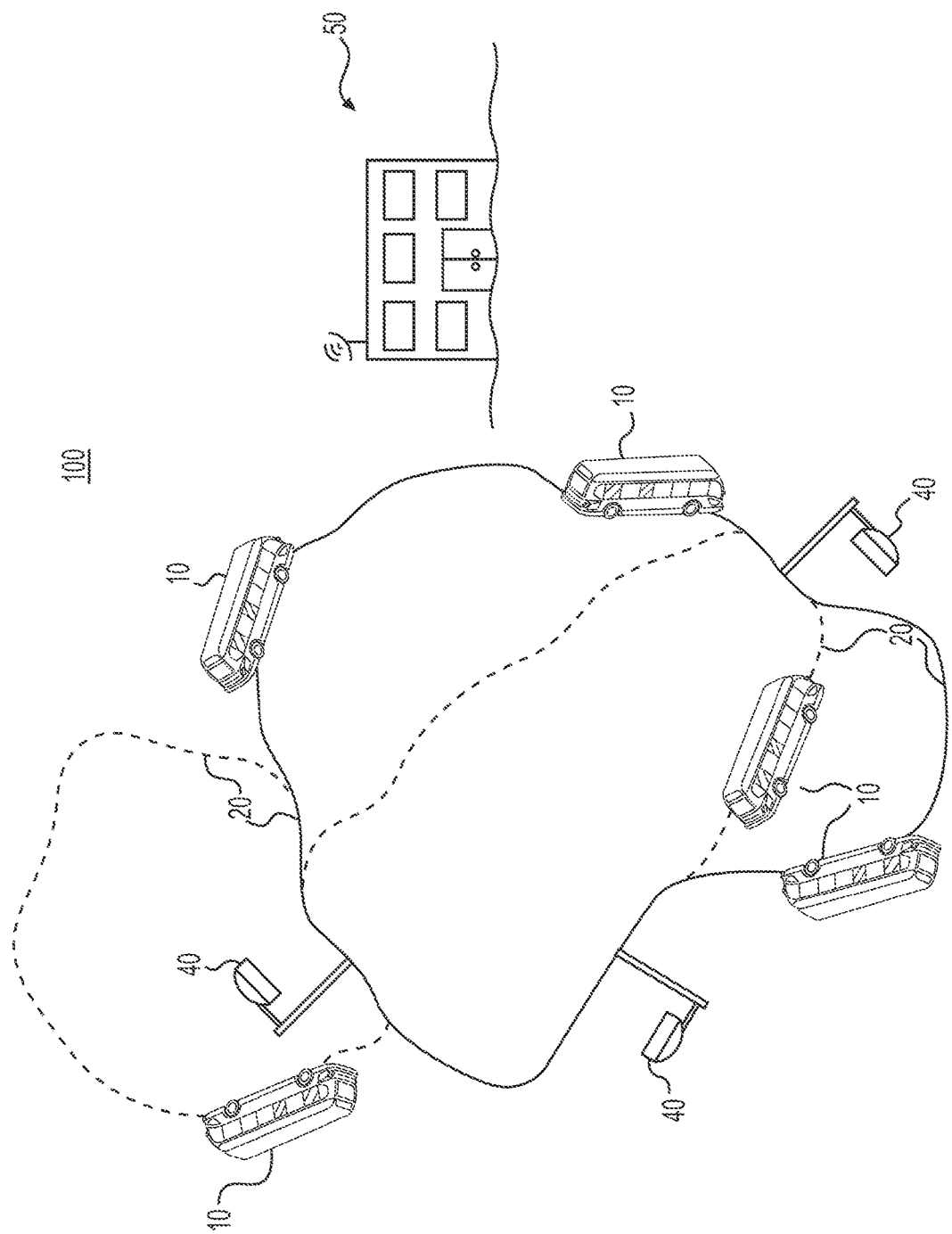
FIG. 2 is a schematic illustration of electric buses operating in multiple routes in a geographic area.

Electric bus 10 may be a transit bus that operates along a fixed route 20 in a geographic area 100. FIG. 2 schematically illustrate multiple buses 10 operating in a geographic area 100 that includes multiple routes 20. Bus 10 may continuously travel along a route 20 within a time window picking up and dropping off passengers at several fixed bus stops along the route 20. Geographic area 100 may include any area (airport, university campus, city, town, county, etc.) that includes one or more routes 20 serviced by one or more electric buses 10. A transit authority 50 (transport authority, airport authority, metro authority, hotel shuttle service, theme park shuttle service, etc.) may operate buses 10 on a fixed schedule. One or more charging stations 40 may be positioned along the different routes 20 to charge buses 10 that operate on these routes 20. Charging stations 40 may be coupled to an electric grid that is supplied with energy (electricity) by a utility company that services geographic area 100.

When bus 10 pulls up to charging station 40, charging electrodes (schematically illustrated in FIG. 3) of charging station 40 separably interfaces with charging blade 16a (see FIG. 1) of bus 10 to charge the batteries 14. After charging the batteries to the desired SOC, the charging electrodes decouple from the charging blade 16a, and bus 10 proceeds along its route 20. After a predetermined distance (or, after a predetermined time, or at a fixed location along route 20), bus 10 pulls into a charging station 40 (the same or a different charging station 40) to get recharged. The charging stations 40 may be positioned such that they service buses 10 operating on several different routes 20. In some embodiments, charging stations 40 may be positioned at a bus stop so that bus 10 may be recharged when passengers embark and disembark. It should be noted that although the discussion above describes on-route charging (using a roof-top charging interface), the current disclosure is applicable to any type of charging (depot charging, etc.).

A utility company may charge the authority 50 for the energy consumed in charging the buses 10 based on a prevailing tariff schedule. The tariff schedule documents the cost per unit of electricity (for example, $/kilo Watt) as a function of several factors. These factors may vary with the geographic area 100, and often includes variables such as the season, time of use, rate of energy consumption, total energy consumed, voltage, etc. Typically, energy cost is higher when the demand for energy is higher (for example, Summer months, and times between 8 AM-10 AM, 4 PM-6 PM, etc.) and lower when the demand is lower (for example, Winter months, and at times between 10 AM-4 PM and 6 PM-8 AM). For a commercial consumer, the energy cost may follow a tiered approach. That is, the energy cost may change with the total power consumed. For example, total power consumption (per billing cycle) between 20 kilo Watts (kW) and 1 Mega Watt (MW) may be charged at a first rate, between 1-50 MW may be charged at a second rate, and above 50 MW may be charged at a third rate. The energy cost may also change as a function of the rate at which energy is consumed. For example, the cost for 100 kWh of energy may be higher if this amount of energy were consumed in one unit of time (unit of time=1 minute, 15 minutes, 30 minutes, etc.) than if it were consumed over a longer time period (for example, in two units of time). Additionally, as known to a person skilled in the art, there are many other energy pricing structures (real-time pricing, day ahead pricing, etc.) that may be reflected in the tariff schedule. The utility company may periodically revise the tariff schedule and communicate this revised schedule to authority 50 and other consumers. The tariff schedule may be digitally transmitted to, or a paper copy may be mailed to, the authority 50.

Charging stations 40 may have any power (for example, 500 kilo watts (kW), 400 kW, 300 kW, etc.) and voltage (700 Volts (V), 600 V, 400 V, 300 V, 200 V, 100 V, etc.). In some embodiments, charging station 40 may be configured to switch between several powers and voltages to charge bus 10. In some embodiments, to minimize passenger wait times, charging station 40 may be configured to recharge bus 10 as fast as possible. For example, assume that bus 10 has batteries 14 that can store 100 kWh of energy therein, and that bus 10 consumes 40 kWh of energy while travelling between a previous recharge and charging station 40. Also assume that charging station 40 is a variable power charging system that is currently configured to charge batteries 14 using 500 kW power at 300 V. At this setting, charging station 40 will recharge 40 kWh of energy (to fully recharge the batteries 14) at a charge current ($I_C$) of 500 kW/300 V=1666 Amps. At this current, bus 10 will be recharged in 40 kWh/500 kW=0.08 hr≈5 minutes. In some cases, charging at this current may lead to an undesirable reduction in battery life. Depending on the type and/or chemistry (and in some cases, other factors as discussed below) of the batteries 14 being recharged, charging station 40 may vary the current directed into the bus for charging (i.e., charge current) to minimize the impact of charging on the life of batteries 14 (i.e., prevent or reduce any detrimental impact that charging has on the life or longevity of the batteries).

Typically increased charge current increases battery temperature and thus detrimentally affects the life of a battery. However, for some battery chemistries and types, charging at or below a specific value of charge current ($I_C$) (or within a selected range of charge currents) may have minimal impact, or a low impact, on battery life. The value of charge current (or the charge current range) that has a low impact on battery life is referred to herein as the optimized charge current ($I_C$) (or optimized range of charge currents). Typically, the value of optimized charge current depends on the SOC of the batteries and its chemistry (and in some cases, other characteristics of the batteries, such as its configuration). In some embodiments, the optimized charge current determined based on the SOC and the chemistry may be adjusted or modified (i.e., increased or decreased) based on other operating parameters of the bus (e.g., battery temperature, etc.) and/or other practical considerations (e.g., energy cost, bus schedule, charging schedule of other buses in a fleet, etc.) to reduce the total cost of ownership or operation of the bus/fleet.

The optimized charge current ($I_C$) for different SOCs for a particular battery chemistry may be determined through experimental testing, or may be provided by the battery manufacturer. For example, a battery (of a particular type or having an exemplary chemistry) may be charged using a charge current of $I_Z$ when its SOC is less than or equal to 20% to have a minimal impact on battery life. However, the same battery may have to be charged at a different charge current $I_Y$ (lower or higher than $I_Z$) when its SOC is between 20% and 50%, and $I_X$ when its SOC is above 50%, to have a comparable low impact on its battery life. The values of $I_Z$, $I_Y$, and $I_X$ may depend upon several factors such as the type and/or chemistry of the batteries, the temperature of the batteries, amount of energy needed by the bus, cost of energy, etc.

Figure 3:
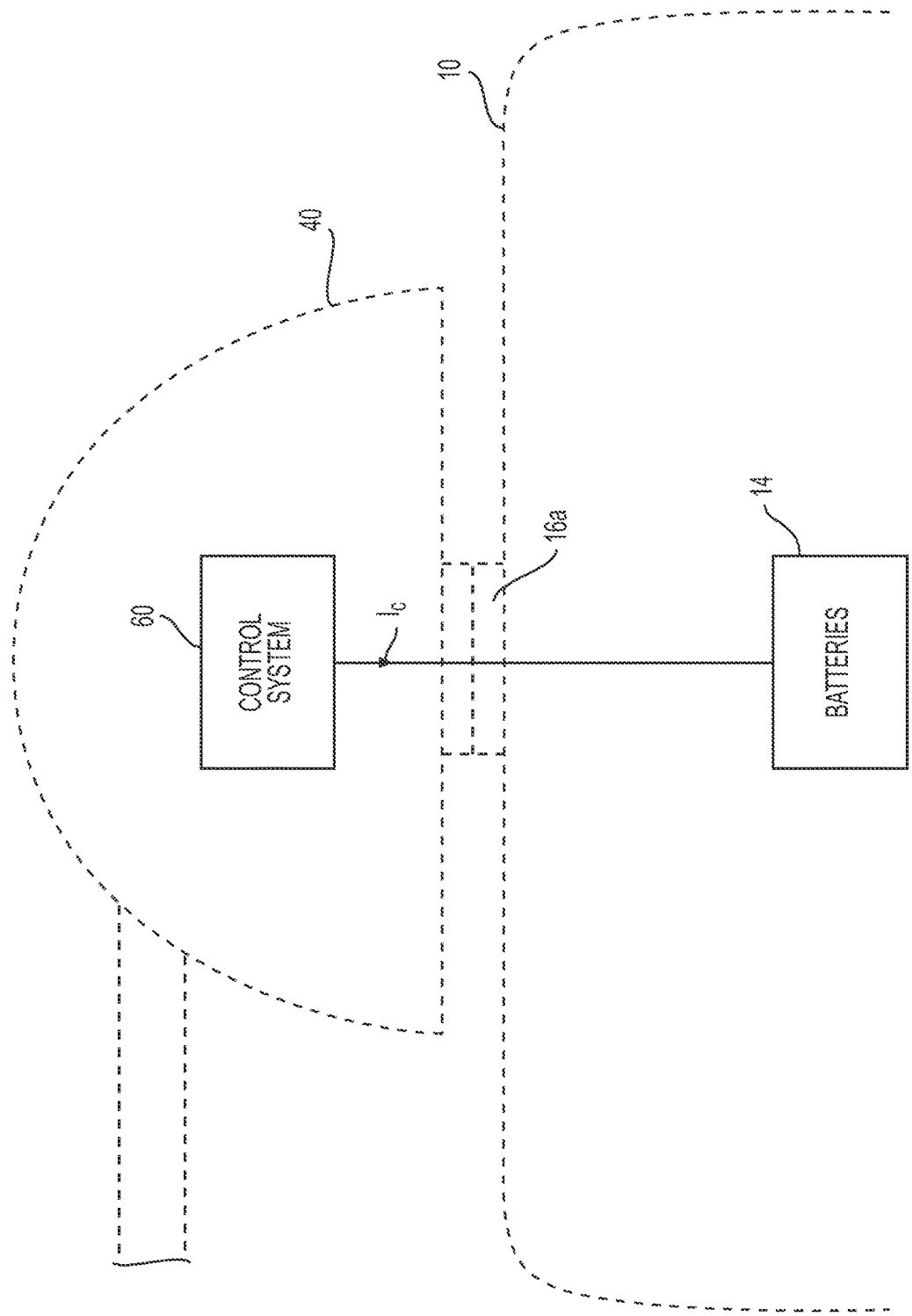
FIG. 3 is a schematic illustration of charging of the bus of FIG. 1 in one exemplary embodiment.

FIG. 3 is a schematic illustration of bus 10 being charged at a charging station 40. The charging station 40 may be operatively coupled to a control system 60 configured to control the charging operations of the charging station 40. Although FIG. 3 illustrates control system 60 as a single component housed in the charging station 40, this is only exemplary. In general, these control systems may be housed in one or both of the bus and the charging station. In some embodiments, the control system 60 may include an electric vehicle charging controller (EVCC) on the bus and a supply equipment charge controller (SECC) located in the charging station. The EVCC and the SECC (referred to be collectively herein as control system 60) may control the charging operation of the bus alone or in conjunction with other controllers (e.g., battery management system or BMS of bus). It is also contemplated that, in some embodiments, control system 60 may reside in one or more computer servers in the offices of the transit authority 50 or may be positioned in bus 10. Control system 60 may be configured to receive data from and/or transmit data to, among others, buses 10, charging stations 40, and the transit authority 50. Control system 60 may transmit and receive data wirelessly and/or over a wired network. As known in the art, control system 60 may include storage devices and computational devices (memories, RAM, microprocessors, transceivers, etc.) configured to store data, perform computations, and relay/receive data to and from the buses 10 and charging stations 40.

After the bus 10 has docked (i.e., physically connected) with the charging station 40, and electrical contact is established between the charging station 40 and the bus 10, the charging station 40 directs charge current ($I_C$) to the bus for charging its batteries 14. As explained previously, to minimize the impact of charging on the life of the batteries 14, the value of charge current ($I_C$) directed to bus 10 may depend on the SOC of its batteries 14 (the SOC at the beginning of charging, current value of SCO, etc.) and the battery chemistry. In some embodiments, the optimized charge current determined based on the SOC and chemistry may be adjusted based on other operational or practical factors. The initial SOC and battery chemistry may be determined by the control system 60 in any manner. In some embodiments, the SOC and chemistry may be determined by the control system 60 after the bus 10 docks with the charging station 40. In some embodiments, the bus 10 may transmit its SOC (and in some cases, chemistry) to the control system 60 as it is approaches the charging station 40. In some embodiments, the chemistry of batteries 14 used in a bus may be stored in the control system 60 (or may be detected by control system 60 from an external source, e.g., the transit authority). For example, as a bus 10 pulls into a charging station the control system 60 may detect the ID of the bus 10, and determine the battery chemistry based on the bus ID (e.g., the control system 60 may associate the bus ID with a particular chemistry).

The control system 60 may determine from a chart or a map (e.g., by looking up in a table, database, list, graph, etc.) the optimized charging current to use with batteries 14 with different chemistries. The control system 60 may include a database with tables, charts, graphs, lists, maps, etc. that indicate the optimized charge current ($I_C$) (charging rate or charging station power) as a function of SOC for different battery chemistries. Alternatively or additionally, control system 60 may include one or more algorithms to determine the charge current ($I_C$) as a function of SOC and battery chemistry. In some embodiments, after the optimized charge current ($I_C$) is determined based on the initial SOC and battery chemistry, the control system 60 charges the bus 10 using the determined optimized charge current ($I_C$). That is, as illustrated in FIG. 3, the determined charge current ($I_C$) is directed to the bus 10 from the charging station 40 to charge the batteries 14. Charging the batteries 14 using the optimized charge current ($I_C$) may have a minimal impact on battery life. In some embodiments, as explained previously, after the optimized charge current ($I_C$) is determined from the map, the control system 60 may modify/adjust (increase or decrease) the determined charge current ($I_C$) based on other parameters or factors. These parameters/factors may include some or all of, for example, the instant or expected battery temperature, the instant or future energy cost, energy requirement (e.g., of the bus 10, of all buses of the fleet, of all charging stations in a geographic locality, etc.), distance to be travelled by the bus until the next charging event, bus operating schedule, etc. In some embodiments, the map-determined optimized charge current ($I_C$) may adjusted based on other practical considerations, such as, for example, current weather conditions (temperature, humidity, wind, etc.), traffic (e.g., route times between charging stations), passenger load, number of other buses along route, etc. These parameters or factors used to modify the map-determined optimized charge current are generally referred to herein as bus-operating and fleet-operating parameters.

In some embodiments, if the battery temperature at the current time is at or above (≥) a threshold value (or the battery temperature during, or at the end of, the charging event is expected to be ≥a threshold value), the control system 60 may de-rate (or decrease) the determined charge current ($I_C$) (i.e., the charge current determined based on the SOC and chemistry) and charge the bus using a lower value of charge current. Temperature sensors positioned on, or proximate, the batteries 14 may inform the control system 60 of the current battery temperature. De-rating the charge current in this manner may prevent an excessive increase in battery temperature during the charging event. In some embodiments (e.g., in winter months), if the current battery temperature is equal to or less than (≤) a threshold value, the control system 60 may increase the determined charge current ($I_C$) and charge the bus using the increased charge current. Increasing the charge current in this manner may help to heat and maintain the temperature of the batteries 14 within a suitable temperature range.

In some embodiments, after the optimized charge current ($I_C$) is determined from the map, the control system 60 may modify the determined charge current ($I_C$) based on energy cost. For example, if the current energy cost is ≥a threshold value, the control system 60 may decrease the charge current to decrease energy consumption, and thereby cost. In some cases if the current energy cost is high (e.g., ≥a threshold), and a future (e.g., 2 minutes later) energy cost is low (e.g., ≤a threshold), the control system 60 may de-rate the charge current now (i.e., decrease the charge current from the map-determined value), and increase the charge current after 2 minutes to decrease the total energy cost during the charging event. Similarly, in some embodiments, if the energy cost is expected to increase during the charging event, the control system 60 may increase the instant charge current, and decrease the charge current when the energy cost increases, to exploit the current low energy cost. Although increasing the charge current above the map-determined value may negatively affect battery life, the cost savings resulting therefrom may make up for this loss, and reduce the total cost of operation (or ownership) of the bus/fleet. In some cases, the control system 60 may adjust the determined charge current ($I_C$) based on a tradeoff between the increase/decrease in battery life and the concomitant decrease/increase in energy cost. For example, the determined charge current may only be adjusted upwards if the resulting cost savings is more than the loss resulting from a reduced battery life. In some embodiments, the control system 60 may include maps, charts, or algorithms that equate incremental values of charge current above the map-determined value to cost. In some embodiments, a predetermined threshold cost value stored in the control system 60 may be used to determine the expected cost of increasing the charge current above the map-determined value (e.g., $x per unit of charge current above the map-determined value).

In some embodiments, the control system 60 may modify the map-determined optimized charge current ($I_C$) based on the energy consumption (known or expected values) of other buses in the fleet. For example, the control system 60 may determine the total amount of energy being consumed by all charging stations 40 in a geographic area 100 (see FIG. 2) in a set period of time, and decrease the determined charge current ($I_C$) to avoid an increase in energy costs due to an increase in demand rate for energy. As is known to a person skilled in the art, in some geographic areas, energy cost may change with the rate at which energy is consumed. For example, the cost per unit of energy may be lower (for e.g., $0.1) when the rate of energy consumption (typically measured as the total energy consumption within a fixed time period, for e.g., 15 minutes) is below a certain value, and higher (that is, >$0.1) when the rate of energy consumption is above this value. In some geographic areas 100, the peak rate of energy consumption in a billing cycle may be used to calculate the total energy cost for the entire billing cycle. For example, if once during the billing cycle, the rate of energy consumption was 3 times the average rate for the rest of the billing cycle (for example, multiple buses charging within a 15 minute window), the total energy cost for the entire billing cycle may be calculated at a higher rate, and thus lead to a significantly higher energy cost.

Therefore, in some embodiments, the control system 60 may determine if charging a bus 10 at the map-determined value of optimized charge current ($I_C$) will result in an increased energy cost (as a result of a threshold value of energy consumption by all charging stations 40 in a predetermined time window being exceeded), and decrease the charge current (at which a bus 10 is charged) below the map-determined value, so that the threshold energy consumption is not exceeded. In some such embodiments, control system 60 may keep track of the energy consumption of all charging stations 40 in the geographic area 100. In some embodiments, the control system 60 may increase the charge current above the map-determined value to exploit a low total energy consumption during the current time window. For example, if the total energy consumption in the geographic area at the current time window is lower than the threshold energy consumption value (e.g., the total amount of energy that can be consumed without resulting in an increase in the demand billing rate), the control system 60 may increase the charge current above the map-determined value. Such a situation may arise when a lower number of buses are expected to charge during the instant time window as compared to a previous time window. Increasing the charge current in this manner may result in future energy savings (e.g., a bus being able to skip a charging event, more number of buses able to be charged in a future time window, etc.).

In some embodiments, the control system 60 may adjust the charge current of one charging station 40 (above or below the map-determined value) to accommodate the charging of another bus 10 at another charging station without increasing energy cost (e.g., by exceeding the threshold energy consumption value). For example, charging stations 40 in a geographic area 100 and the buses 10 operating in the geographic area 100 may communicate with each other during operation. Based on this communication, the control system 60 associated with one charging station 40 may determine that several buses are to be charged in the current time window, and charging every bus using their corresponding optimized charge current ($I_C$) will increase the total energy consumed over the threshold value. Therefore, the control system 60 may adjust the charge current (above or below the map-determined value) used to charge a bus 10, to accommodate the charging of another bus 10 at a different charging station in the predetermined time window.

In some embodiments, the control system 60 may also modify the charge current based on factors such as the operating schedule of bus 10 (and/or other buses in the fleet). For example, if charging the bus at the map-determined value of optimized charge current will take 15 minutes, and the bus 10 is scheduled to stop at the charging station 40 (e.g., at the bus stop associated with the charging station 40) for only 10 minutes (i.e., layover time ($t_{layover}$)=10 minutes), the control system 60 may adjust the charge current upwards to charge the batteries 14 to the desired value within the layover time. In some embodiments, the control system 60 may adjust the map-determined optimized charge current to correct, or adjust, the schedule of the bus (i.e., to account for a delayed or early bus). For example, the control system 60 may increase or decrease the charge current above or below the map-determined value to correct (or make up) the schedule of a delayed or an early bus.

In some embodiments, the charging station 40 may use the same charge current ($I_C$) during the entire charging process. That is, the optimized charge current ($I_C$) that was determined using the initial SOC of the batteries 14 (SOC at the beginning of charging), and modified based on the previously described bus-operating and/or fleet-operating parameters, may be used for the entire charging process. However, in some embodiments, the charging station 40 may dynamically update the charge current ($I_C$) based on its instant SOC and/or other factors. That is, the control system 60 may periodically determine the SOC of the batteries 14 as charging proceeds, determine the optimized charge current corresponding to the then-existing SOC, and charge the bus 10 using this newly determined charge current. In some embodiments, these periodically updated charge currents may be further modified based on the factors discussed above. In some embodiments, during charging, the control system 60 may continuously check the SOC and the factors (e.g., energy cost, battery temperature, energy consumption in the locality, etc.) and update the charge current ($I_C$). However, in some embodiments, the control system 60 may only determine the SOC (and other factors) and revise the charge current a limited number of times (once, twice, three times, etc.) during a charging event. The number of times (or the frequency with which) the charge current is updated may depend upon the application, and in some embodiments, may be preset. In some embodiments, the optimized charge current ($I_C$) determined using the initial SOC of the batteries 14 may be periodically modified based on the previously described bus-operating and/or fleet-operating parameters and used to charge the batteries 14.

Figure 4:
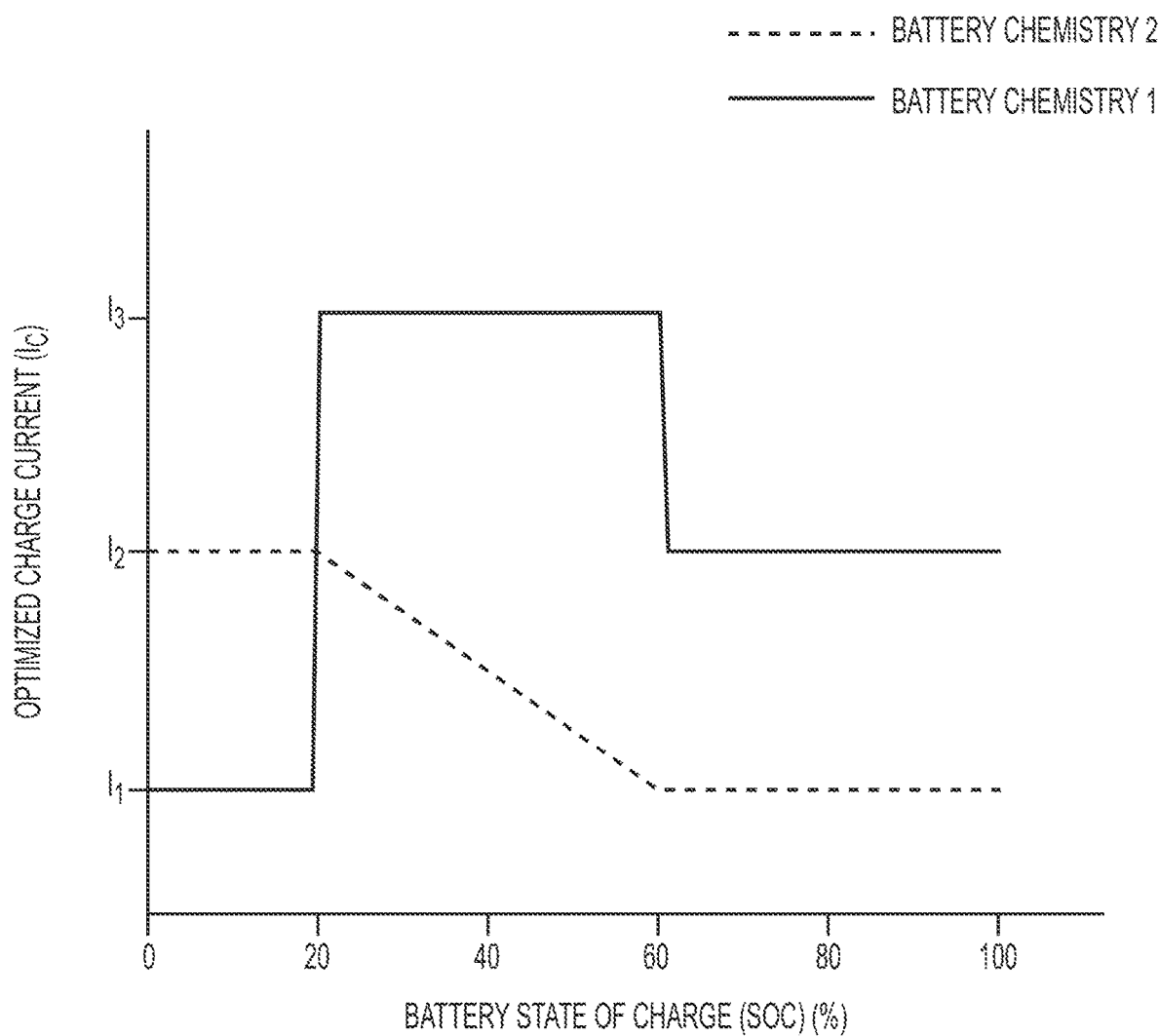
FIG. 4 is a chart showing exemplary embodiments of optimized charging currents as a function of state of charge for different battery chemistries.

FIG. 4 is a graph that plots optimized charge currents ($I_C$) (or optimized charge rates) as a function of battery SOC (%) for two exemplary battery chemistries. It should be noted that the trend of the curves illustrated in FIG. 4 is only exemplary. In general, the optimized charge current ($I_C$) may vary in any manner as a function of SOC. A chart similar to the graph shown in FIG. 4 (or similar data) may be stored in control system 60 and may be referenced by control system 60 to determine the optimized charge current ($I_C$) for batteries 14. In this regard, the terms map or chart are used to mean any listing (table, graph, reference book, database, list, etc.) or algorithm used to determine the value of optimized charge current from various inputs (SOC, battery chemistry, bus-operating and fleet-operating parameters, etc.). Based on the battery chemistry and the SOC of the batteries 14, the control system 60 may determine the optimized charge current ($I_C$) used to charge the bus 10. As explained previously, in some embodiments, this map-determined optimized charge current ($I_C$) may be further modified (i.e., adjusted higher or lower) based on the previously described bus-operating and/or fleet-operating parameters. The modified charge current may then be used to charge the bus 10.

Although the optimized charge current ($I_C$) is described as being initially determined based on the battery SOC and battery chemistry (e.g., from a map similar to the graph of FIG. 4), and then modified based on the previously described bus-operating and/or fleet-operating parameters, this is only exemplary. In some embodiments, the optimized charge current ($I_C$) may initially be determined based on all these factors (SOC, chemistry, bus-operating parameters, and fleet-operating parameters). For example, the map, chart, table, algorithm, etc. included in the control system 60 may provide the value of optimized charge current ($I_C$) as a function of all these factors.

Figure 5A:
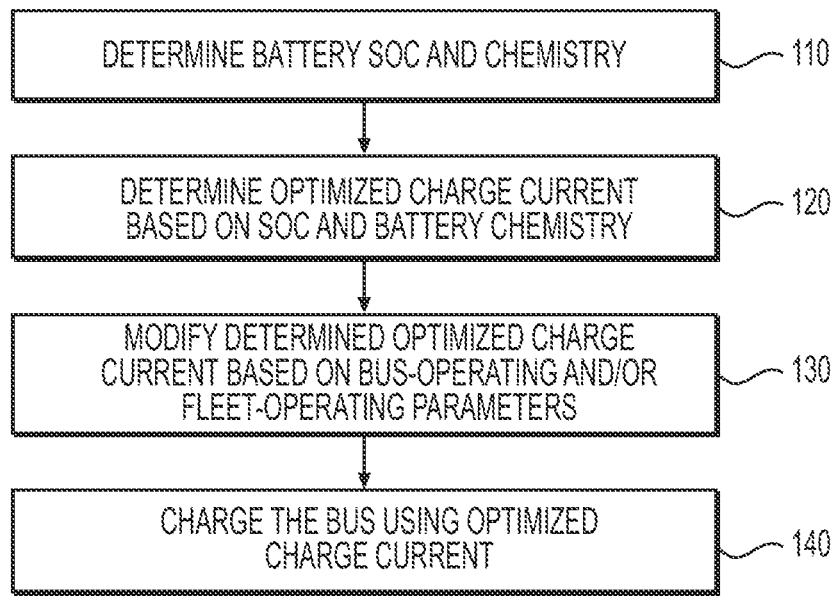
FIGS. 5A, 5B and 5C are flow charts that illustrate exemplary bus battery charging processes.

FIG. 5A illustrates an exemplary method of charging the batteries 14 of a bus 10 at a charging station 40. The SOC of the batteries 14 may first be detected by the control system 60 (step 110). The SOC may be determined in any manner. In some embodiments, the control system 60 may detect the current SOC of the batteries 14 when the bus docks with the charging station 40. In some embodiments, as the bus 10 approaches the charging station 40 for charging, it may transmit information, including the current SOC of its batteries 14 to the charging station 40. It is also contemplated that, in some embodiments, the SOC of the bus 10 may be provided to the charging station 40 by another source (e.g., the transit authority). In some embodiments, the battery chemistry may be programmed into the control system 60 (e.g., when all the buses 10 use batteries having the same battery chemistry). In some embodiments, the control system 60 may detect the battery chemistry as the bus approaches the charging station 40 (e.g., based on the bus ID, etc.).

The control system 60 may then determine the optimized charge current ($I_C$) at the detected SOC for the chemistry of batteries 14 (step 120). The control system 60 may then modify or adjust (i.e., increase or decrease) the determined optimized charge current (from step 120) based on the previously described bus-operating and/or fleet-operating parameters (step 130). The control system 60 may then direct the charging station 40 to charge the bus 10 using a charge current substantially equal to the optimized charge current ($I_C$) (step 140). In some embodiments, step 130 may be eliminated and the control system 60 may charge the bus using the optimized charge current determined in step 120.

In some embodiments, substantially the entire charging event may progress at the initially determined optimized charge current (from step 120 or step 130). However, in some embodiments, the control system 60 may periodically update the optimized charge current $I_C$ (in step 120 or step 130) using instant values of the parameters (SOC, bus-operating and/or fleet-operating parameters, etc.). For example, while charging bus 10, the control system 60 may periodically determine the SOC of its batteries 14 (step 120), determine the optimized charge current $I_C$ to use with the current SOC (step 120), modify the determined optimized charge current based on bus-operating and/or fleet-operating parameters (step 130), and then adjust the charge current provided to the bus (step 140). With reference to FIG. 4, if at the beginning of charging, the SOC of a battery with Battery Chemistry 1 is 30%, the control system may charge the battery using a charge current of $I_3$. While charging using this charge current, the control system may periodically check the SOC of the bus, and when the SOC of the bus reaches, for example, 60%, the control system 60 may change the charging current to $I_2$ (based on the table). By periodically determining the batteries' SOC and adjusting the charging current to an optimized charge current ($I_C$) based on current SOC (and, in some cases, other parameters), the charging station may prevent damage to the life of the battery.

Figure 5B:
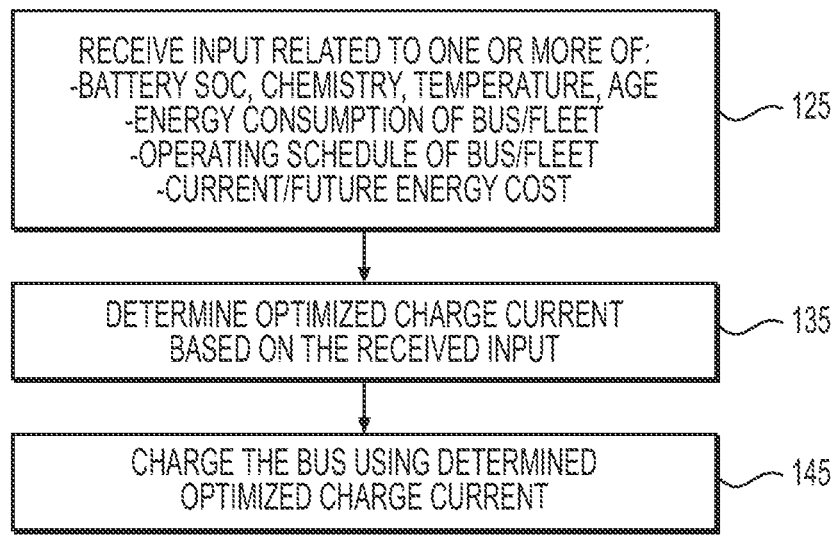

In embodiments where the control system 60 includes an SECC on the charging station and an EVCC on the bus, the EVCC may determine the optimized charge current based on the SOC of the batteries 14 (i.e., step 120), and request the SECC to charge the bus using the determined optimized charge current. In response to this request, the SECC may provide the requested charge current to the bus (step 140), or modify the determined optimized charge current value based on bus-operating and/or fleet-operating parameters (i.e., step 130), and then charge the bus 10 using the modified optimized charge current. It should be noted that, although the optimized charge current is described as being first determined based on the battery SOC and chemistry (step 120), and then modified based on bus-operating and/or fleet-operating parameters (i.e., step 130) in the method of FIG. 5A, this is only exemplary. In some embodiments, as illustrated in FIG. 5B, the control system 60 (SECC, EVCC, etc.) may receive input related to some or all of the relevant parameters (battery SOC, temperature, chemistry, age, energy needed, instant and future energy cost, information related to expected energy consumption of the fleet, bus/fleet schedule, etc.) (step 125), determine the optimized charge current as a function of the received input (step 135), and then charge the bus using the determined optimized charge current (step 145). For example, control system 60 may include maps, charts, algorithms, etc. that provide the value of optimized charge current corresponding to the received input.

Figure 5C:
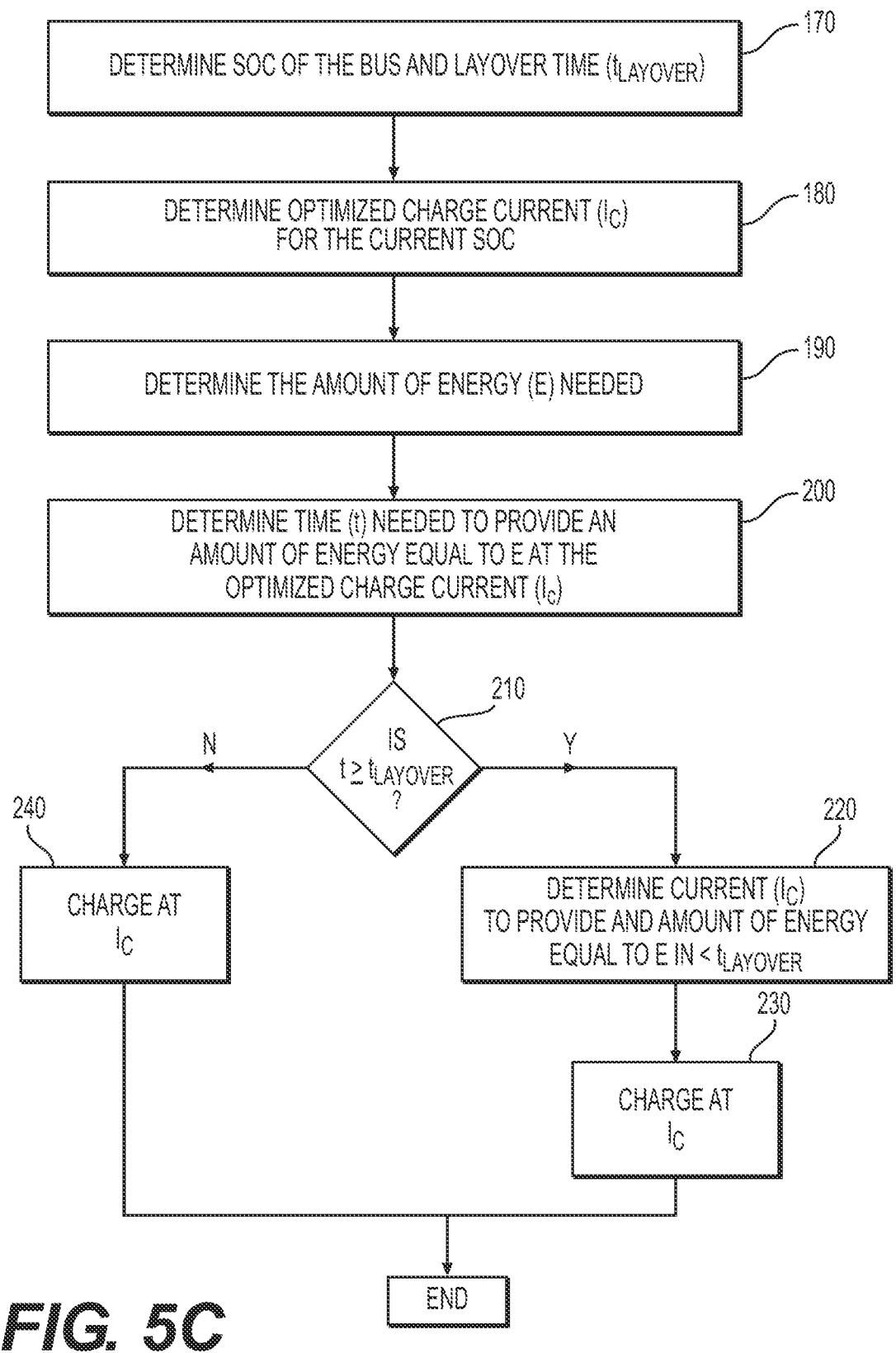

FIG. 5C illustrates an exemplary method of charging the batteries 14 at a charge current different from the optimized charge current ($I_C$). Prior to charging, the control system may determine the SOC of the batteries 14 and the layover time of the bus 10 at the charging station (step 170). As explained previously, the SOC may be determined based on data stored in the control system 60, or based on communications from the bus 10 or another external source. The layover time of the bus 10 may also be determined based on data stored in the control system 60 (e.g., schedule of the bus) or based on data communicated from an external source (bus 10, transit authority, etc.). Using the determined SOC (from step 170) and the battery chemistry (and in some embodiments, bus-operating and fleet-operating parameters), the control system 60 may determine the optimized charge current ($I_C$) (step 180). The control system 60 may then determine the amount of charge or energy (E) needed by the bus 10 (step 190). In some embodiments, the control system 60 may be programmed with a default value of charge (e.g., 100% SOC, 90% SOC, etc.) to provide to the bus 10. In some embodiments, the control system 60 may determine the amount of energy needed by the bus 10 based on the bus schedule (e.g., programmed into the control system 60, provided by bus, etc.). For example, the control system 60 may determine the amount of energy (E) needed by the bus 10 until its next scheduled charging event. The control system 60 may then determine the time (t) needed to provide an amount of energy equal to E using the determined optimized charge current ($I_C$) (step 200). If this time (t) is greater than or equal to the layover time ($t_{layover}$) (step 210), the control system 60 may determine the charge current ($I_C'$) needed to provide an amount of energy equal to E within a time less than the layover time ($t_{layover}$) (step 220), and charge the bus 10 using this determined charge current ($I_C'$) (step 230). If the time (t) needed to provide an amount of energy equal to E using the determined optimized charge current ($I_C$) is not greater than or equal to $t_{layover}$ (step 210=No), the control system 60 may charge the bus using the optimized charge current ($I_C$) (step 240).

In an exemplary application, the bus 10 may have a SOC of 20% at the beginning of charging, and the default SOC value to which the bus 10 is to be charged is 80% SOC (based on the charging schedule). The control system 60 may determine that the time required to charge the bus to this desired value will exceed the layover time. The control system 60 may then determine that the bus 10 only needs to be charged to an SOC of 50% to reach the next charging event, and charging at an optimized charge current of $I_C$ for a period of time equal to the layover time (e.g., 10 minutes) will charge the bus to 60% SOC (i.e., to a value greater than what is required to reach the next charging event but less than the SOC value to which the bus will normally be charged). Therefore, the control system 60 may charge the bus at the determined optimized charge current ($I_C$) to 60% SOC.

It should be noted that although charging of a bus 10 using an overhead charging station 40 is described above, this is not a limitation. The current disclosure is applicable to charging any type of vehicle using any type of charging source (depot charger, inductive charger, etc.). In an embodiment of the current disclosure where the bus 10 is charged by depot-charging (or a passenger car is charged at night while parked at home), charge current may be supplied to the batteries 14 via a cable plugged into the charge port 19 (see FIG. 1). In some embodiments, the cable may be connected to a utility grid via a charger (e.g. a console housing electrical components such as inverters, circuit breakers, etc.) that includes one or more components of control system 60 (e.g., SECC). The charge current directed into the bus 10 is used to charge the batteries 14 and to power onboard accessories (e.g., HVAC, heaters, defrosters, etc.) that are on during this time. The process of using grid current to power on-board accessories during charging is referred to as preconditioning (e.g., by preheating the passenger cabin to the desired temperature, preheating the battery system prior to charging, etc.). Preconditioning the bus 10 using grid power (as opposed to battery power) conserves battery power and increases efficiency. During depot charging, the control system 60 may determine the optimized charge current ($I_C$) to direct to the bus 10 based on SOC of the batteries, its type and/or chemistry, and the current required to power onboard accessories (electrical load) needed for preconditioning. For example, a controller on the bus (e.g., EVCC, etc.) may periodically monitor the SOC of the batteries 14 and the electrical load (e.g., the power needed by onboard accessories) on the bus 10. And, based on a map or a chart (e.g., programmed into the controller), determine the required charge current. The EVCC may then send a request for the determined charge current to the controller of the charger (e.g., SECC). Upon receipt of the request, the SECC may direct charge current to the bus through the charge port 19.

Charging the batteries at the optimized charge current ($I_C$) may help minimize the impact of charging on battery life. In some such embodiments, the determined optimized charge current ($I_C$) may also be adjusted lower or higher due to practical considerations. For example, the determined optimized charge current ($I_C$) may be adjusted higher or lower based on the amount of time the bus (or car) is expected to stop at the charging station. In some embodiments, the bus will include batteries of different chemistries. In some such cases, the control system 60 may determine the lowest optimized charge current ($I_C$) for the different battery chemistries and charge all the batteries of the bus using the lowest optimized charging current.

While principles of the present disclosure are described with reference to an electric bus, it should be understood that the disclosure is not limited thereto. Rather, the systems and methods described herein may be employed to manage recharging of any electric vehicle (all-electric or hybrid vehicles). Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

The invention claimed is:

1. A method for charging an electric vehicle battery system, comprising:
   receiving a chemistry of the battery system from the electric vehicle battery system as the electric vehicle approaches a charging station;
   after receiving the chemistry of the battery system, electrically connecting the electric vehicle to the charging station;
   after electrically connecting the electric vehicle to the charging station, determining a state of charge of the battery system and a passenger load of the electric vehicle;
   determining a charge current based on at least the determined state of charge and the chemistry of the battery system from a database that identifies the charge current as a function of state of charge for multiple battery chemistries;
   adjusting the determined charge current to a modified charge current based on the determined passenger load;
   charging the electric vehicle by directing a value of current based on the modified charge current from the charging station to the battery system;
   determining an updated state of charge of the battery system after initiation of charging;
   determining a revised charge current based at least on the determined updated state of charge; and
   adjusting the value of current directed to the vehicle based on the revised charge current.

2. The method of claim 1, wherein receiving the chemistry of the battery system from the electric vehicle battery system includes receiving the chemistry of the battery system from a signal received from the electric vehicle.

3. The method of claim 1, wherein electrically connecting the electric vehicle to the charging station incudes connecting a charging brace of an overhead charging station to electrodes on a roof of the electric vehicle.

4. The method of claim 1, further comprising:
   determining a distance to be traveled by the electric vehicle to the next charging event.

5. The method of claim 4, further comprising:
   adjusting the determined charge current to the modified charge current further based on the determined distance to the next charging event.

6. The method of claim 1, further comprising
   determining the revised charge current further based at least one of (a) battery temperature, (b) energy cost, and (c) an amount of energy needed by another electric vehicle.

7. The method of claim 1, wherein adjusting the value of the current directed to the vehicle based on the revised charge current includes increasing the magnitude of the modified charge current.

8. The method of claim 1, wherein adjusting the value of the current directed to the vehicle based on the revised charge current includes decreasing the magnitude of the modified charge current.

9. The method of claim 1, wherein the electric vehicle is an electric bus.

\* \* \* \* \*